United States Patent [19]

Golembiewski et al.

[11] Patent Number: 5,704,582
[45] Date of Patent: Jan. 6, 1998

[54] SELF-ADJUSTING SUPPORT BLOCKS

[75] Inventors: Ronald Golembiewski, Sterling Heights; Bary St. Clair, Warren; John Kamon, Harrison Twp., all of Mich.

[73] Assignee: Chrysler Corporation, Auburn Hills, Mich.

[21] Appl. No.: 748,704

[22] Filed: Nov. 13, 1996

[51] Int. Cl.⁶ ............................................. E02D 27/44
[52] U.S. Cl. ................... 248/500; 248/188.2; 248/188.8; 248/678; 248/688
[58] Field of Search ............................. 248/688, 682, 248/677, 188.1, 188.2, 188.8, 231.41, 316.4, 678, 649, 676, 500, 506; 52/126.6, 126.5, 126.1

[56] References Cited

U.S. PATENT DOCUMENTS

| | | | |
|---|---|---|---|
| 4,703,911 | 11/1987 | Rammell | 248/677 |
| 5,000,416 | 3/1991 | Fantasia | 248/677 X |
| 5,104,075 | 4/1992 | Freeman | 248/677 X |
| 5,110,082 | 5/1992 | Rowan, Jr. | 248/673 X |

*Primary Examiner*—Wynn E. Wood
*Assistant Examiner*—Yvonne Horton-Richardson
*Attorney, Agent, or Firm*—Lawrence J. Shurupoff

[57] ABSTRACT

A support block for use with other similar support blocks to support a die in an elevated position above a factory floor. Each support block comprises a body having a horizontal top surface for supporting a flange extending laterally outwardly from the bottom of the die. A vertical rod is slidably received in a central bore of the body and has a head on the upper end. The rod is disposed in a notch in the bottom flange of the die and a spring in the body urges the rod down to clamp the flange between the top surface of the body and a washer under the head of the rod. The rod has a spacer between the head and the top surface of the body to maintain a minimum spaced relation between the head of the rod and the top surface of the body. The support block is tethered to an anchor on the die by an elongated flexible linear member which is of sufficient length to enable the support block to be positioned under the die flange with its rod in one of the notches. A clip is attached to the head of the rod and is releasably engageable with the anchor to retain the block close to the anchor without swinging when the block is not in use.

9 Claims, 2 Drawing Sheets

SELF-ADJUSTING SUPPORT BLOCKS

FIELD OF THE INVENTION

This invention relates generally to support blocks and more particularly to a self-adjusting block for supporting and storing a die or like heavy equipment above a factory floor.

BACKGROUND AND SUMMARY

Factory floors, while at present maintained in much cleaner condition than in prior years, still accumulate a certain amount of dirt and foreign matter. For that and possibly other reasons, it is desirable to store many items of heavy equipment off the factory floor. A die, for example, has a bottom surface which may rest on a press bed when in use. Any dirt or foreign matter on the bottom surface of the die, picked up from the factory floor during storage, may affect the accuracy of parts made from the die.

In accordance with the present invention, support blocks are provided for supporting a die or like heavy equipment in an elevated position above a factory floor. Each block comprises a body having a bottom surface adapted to rest on the floor and a top surface adapted to support the die. In order to clamp the block to the die, the block has a rod extending into a vertical bore in the body, with a head formed on the upper end of the rod. A spring inside the body urges the rod downwardly, and the head of the rod is held in spaced relation above the top of the body against the force of the spring by a spacer sleeved on the rod.

Preferably, the die has a laterally outwardly projecting bottom flange formed with a plurality of spaced-apart notches. The die flange is adapted to rest on the top surface of the block with the rod received in one of the notches. Preferably, a washer is provided under the head of the rod which bears down on the bottom flange of the die to clamp the support block to the die. The spring imparts adjustability to the block, enabling it to clamp onto die flanges of differing thickness.

Preferably, an elongated flexible linear member or tether is provided to secure each support block to the die. The tether is anchored to the die and is of a length sufficient to enable the block to be positioned under the die flange with its rod received in one of the notches. However, when the block is not supporting the die, it is desired to clip the block closely to the anchor to prevent it from swinging when the die is moved and for that reason a clip is provided, attached preferably directly to the head of the rod.

One object of this invention is to provide a support block for use with other similar blocks in supporting a die or like heavy equipment above a factory floor having the foregoing features and advantages.

Another object is to provide a support block which is of relatively simple construction and made of only a few simple parts, is rugged and durable in use, and is capable of being readily manufactured and assembled.

These and other objects, features and advantages of the invention will become more apparent as the following description proceeds, especially when considered with the accompanying drawings and claims.

DETAILED DESCRIPTION

Figure 1:
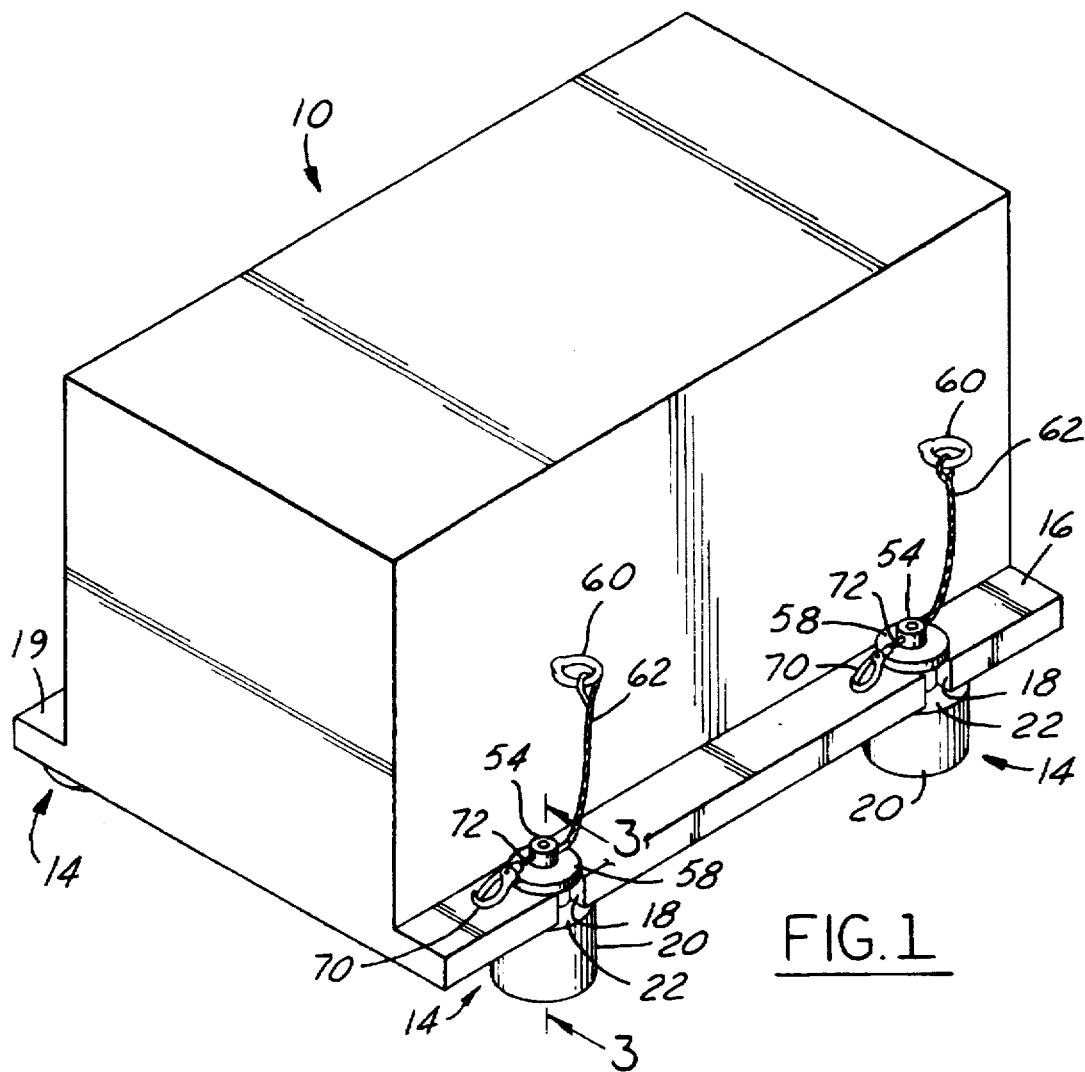
FIG. 1 is a perspective view showing a die supported on a plurality of support blocks constructed in accordance with this invention.

Referring now more particularly to the drawings, an item of heavy factory equipment, in this case the lower die 10 of a die set, is supported above a factory floor 12 by a plurality of support blocks 14. The die 10 has projecting laterally outwardly from its lower surface a horizontal bottom flange 16 formed with a plurality of laterally spaced-apart notches 18. Preferably, there will be at least one notch adjacent each end of the flange. It will be understood that the side of the die 10 opposite the side shown, will also have a similar laterally outwardly extending bottom flange 19 with notches at least at the ends. These bottom flanges are intended to be supported upon the support blocks in the positions shown to keep the bottom surface of the die spaced above the factory floor.

The support block 10 in this instance is in the form of a vertical cylindrical body 20 of uniform circular cross-section throughout its height, although it may be square or rectangular or of other configurations. The body 20 has a top horizontal surface 22 and a bottom horizontal surface 24. The bottom surface 24 of the body is adapted to rest on the floor 12 and the bottom surface of the flange 16 is adapted to rest on the top surface 22 of the body. Each support block is located in a notch in the bottom flange of the die. Usually at least four support blocks are required to support the die at the four corners.

The body 20 has means for clamping onto the die, such means including a vertical rod 30 which extends within a vertical central bore 32 in the body. The central bore extends completely through the body from the top surface to the bottom surface thereof. The bore 32 has a relatively large diameter lower portion 34 and a smaller diameter upper portion 36 extending from the upper end of the large diameter portion through the top surface of the body. A shoulder 38 is formed at the upper end of the large diameter portion. The rod is freely vertically slidable within the bore 32, being closely received in the upper portion 36 of the bore, and has a nut 40 threaded on the lower end to retain a washer abutment 42 sleeved on the rod 30. A second washer abutment 44 loosely sleeved on the rod 30 bears against the shoulder 38. A compression coil spring 50 encircles the rod between the two washer abutments 42 and 44 and urges the rod downwardly.

The rod 30 has a head 54 at the upper end. A spacer 56 and washer 58 are loosely sleeved on the rod between the head 54 and the top surface 22 of the block, with the washer 58 being above the spacer. The spacer and washer maintain a minimum spaced relationship between the head of the rod and the top surface 22 of the body against the force of the compression spring 50.

The support blocks are positioned with the body thereof supporting the bottom flange 16 of the die and with the spacer 56 and portion of the rod above the top surface of the die received in one of the notches 18 in the bottom flange. The pressure of the compression spring 50 holds the support block 14 clamped to the bottom flange 16 of the die, with the washer 58 pressing down on the top surface of the flange 16, even when the die is raised and moved to another location.

The support blocks can, of course, be removed from the flange 16 of the die when the die is lifted far enough to raise the support blocks off the floor. This removal of the support blocks can be accomplished by manually raising the rod 30 relative to the body 20 against the compression of spring 50.

An anchor in the form of an I-bolt 60 is attached to the die, one such anchor preferably being provided for each support block. One end of a tether in the form of an elongated flexible linear member 62 is permanently attached to the anchor and the other end is permanently attached to the support block, preferably to the head 54 of the rod. The tether is long enough to permit the support block to be positioned under the bottom flange 16 of a die in one of the notches, and is provided so that the support block will always be attached to the die and will not become separated and misplaced.

Figure 2:
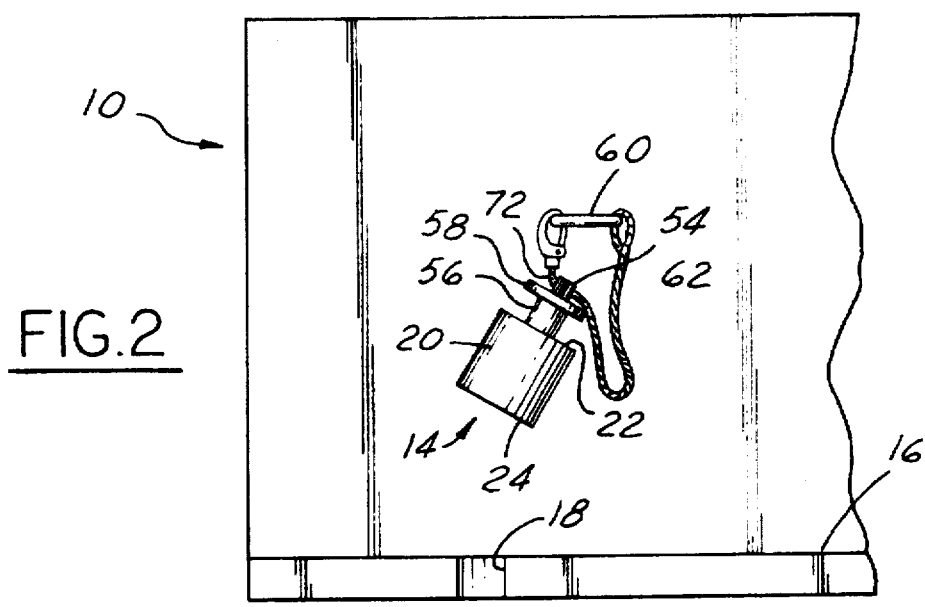
FIG. 2 is a fragmentary elevational view of the structure of FIG. 1, but showing a support block attached closely to an anchor on the die, when the support block is not in use.
Figure 3:
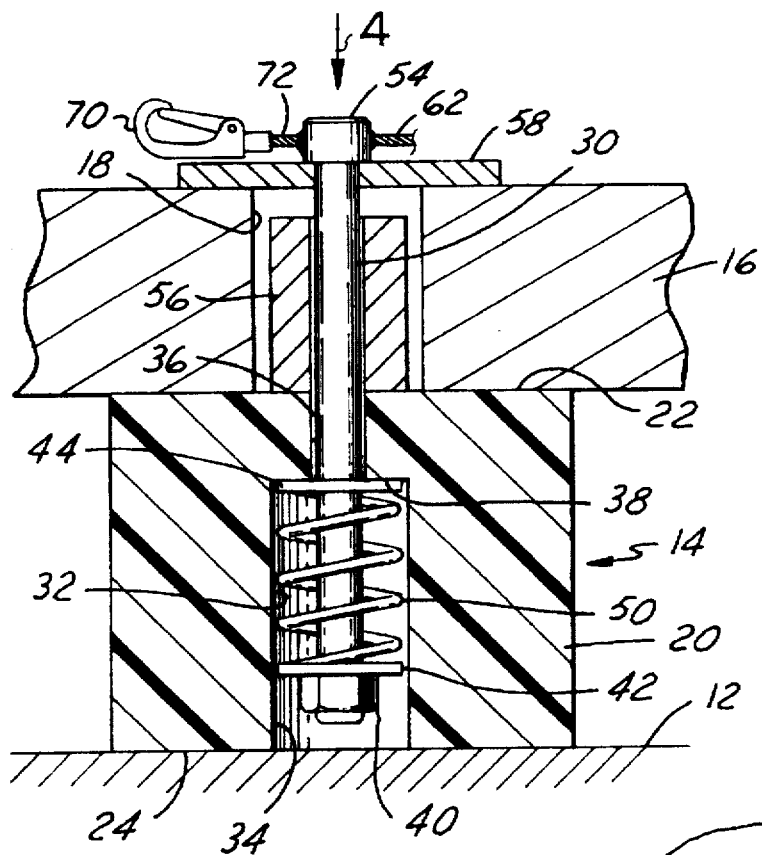
FIG. 3 is a fragmentary sectional view taken on the line 3—3 in FIG. 1.
Figure 4:
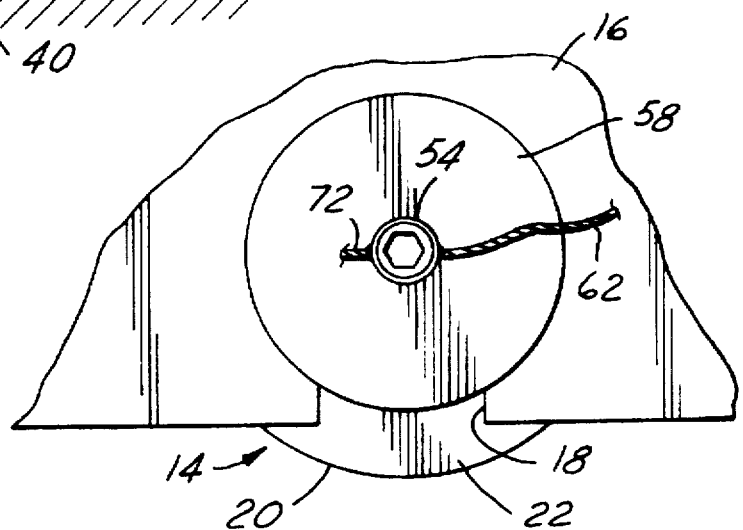
FIG. 4 is a fragmentary top view in the direction of the arrow 4 in FIG. 3.

Each support block also has a releasable clip 70 preferably attached to the head of the rod 30, which is either attached directly to the rod head 54 or to a very short tether 72 so that when the support block is not being used to support the die, it can be attached to the anchor by means of the clip 70 (see FIG. 2) so that it will not swing and become a hazard as, for example, when the die is moved from place to place.

The spring 50 imparts adjustability to the block. It is sufficiently compressible to permit a support block to clamp onto die flanges of differing thickness.

We claim:

1. A support block for use with other support blocks of the same construction in supporting a die or like heavy equipment in an elevated position above a factory floor, said support block comprising:

a body having horizontal top and bottom surfaces, the bottom surface of the body being adapted to rest on the floor and the die being adapted to rest on the top surface of the body, said body having means for clamping onto the die comprising a vertical rod, a central vertical bore in said body extending through the top surface thereof, said rod having a lower end portion slidably received in said bore and an upper end portion formed with a head spaced above the top surface of the body, spring means in said body urging said rod downwardly, and means for holding the head of the rod in spaced relation about the top surface of the body against the force of said spring means including a spacer sleeved on said rod between said head and said top surface.

2. A support block as defined in claim 1, wherein said spring means comprises a compression coil spring encircling said rod.

3. A support block as defined in claim 1, wherein said holding means also includes a washer sleeved on the rod between said spacer and said head.

4. A support block as defined in claim 3, wherein said spring means comprises a compression coil spring encircling said rod, said rod having a bottom end provided with a first abutment, said body having a second abutment in said bore spaced above said first abutment, said coil spring being compressed between said abutments, and a washer sleeved on said rod between said spacer and said head.

5. In combination, a die having a laterally outwardly projecting bottom flange formed with a plurality of spaced-apart notches, and a plurality of support blocks for supporting said die in an elevated position above a factory floor, each support block comprising:

a body having horizontal top and bottom surfaces, the bottom surface of the body being adapted to rest on the floor and the die flange being adapted to rest on the top surface of the block, said block having means for clamping onto the die flange comprising a vertical rod, a central vertical bore in said body extending through the top surface thereof, said rod having a lower end portion slidably received in said bore and an upper end portion formed with a head spaced above the top surface of the body, spring means in said body urging said rod downwardly, and means for maintaining a minimum spaced relation between the top surface of the body and the head of the rod including a spacer and a washer above said spacer, said spacer and washer being sleeved on said rod between said head and said top surface, said rod and sleeve being disposed in one of the notches in said bottom flange with said washer bearing down on said bottom flange under the force of said spring means.

6. A combination as defined in claim 5, wherein said spring means comprises a compression coil spring encircling said rod.

7. A combination as defined in claim 6, wherein said rod has a bottom end provided with a first abutment, said body having a second abutment in said bore spaced above said first abutment, and said coil spring is compressed between said abutments.

8. A combination as defined in claim 5, and further including an elongated flexible linear member having a first end secured to the head of said rod and a second end secured to an anchor on said die, said flexible linear member being of a length sufficient to enable the support block to be positioned under the bottom flange of the die with the rod and spacer disposed in one of said notches, and a clip attached to said head and releasably engageable with said anchor to retain said block close to said anchor without appreciable swinging when said block is not in use.

9. A combination as defined in claim 8, wherein said spring means comprises a compression coil spring encircling said rod, and wherein said rod has a bottom end provided with a first abutment, said body having a second abutment in said bore spaced above said first abutment, and said coil spring is compressed between said abutments.

* * * * *